United States Patent [19]

Duranel et al.

[11] Patent Number: 4,960,744

[45] Date of Patent: Oct. 2, 1990

[54] CATALYST SYSTEM FOR THE POLYMERIZATION OF PROPYLENE AND PROCESS

[75] Inventors: Laurent Duranel, Pau; Roger Spitz, Serezin du Rhone, both of France

[73] Assignee: Atochem, France

[21] Appl. No.: 785,795

[22] Filed: Oct. 8, 1985

[30] Foreign Application Priority Data

Oct. 16, 1984 [FR] France ................. 84 15843

[51] Int. Cl.$^5$ .................... C08F 4/51; C08F 4/654; C08F 10/06
[52] U.S. Cl. .................... 502/127; 502/134; 526/125; 526/351; 526/906
[58] Field of Search ............. 502/117, 132, 134, 127

[56] References Cited

U.S. PATENT DOCUMENTS

| | | | |
|---|---|---|---|
| 3,180,837 | 4/1965 | Bruce et al. | 526/165 |
| 3,238,146 | 3/1966 | Hewett et al. | 526/125 |
| 3,773,735 | 11/1973 | Diedrich | 526/153 |
| 4,159,963 | 7/1979 | Sahurai et al. | 526/125 |
| 4,234,710 | 11/1980 | Moberly et al. | 526/125 |
| 4,330,650 | 5/1982 | Sakurai et al. | 526/127 |
| 4,366,298 | 12/1982 | Kurz | 526/125 |
| 4,387,201 | 6/1983 | Bahadir | 526/125 |
| 4,442,225 | 4/1984 | Takitani et al. | 502/112 |
| 4,442,276 | 4/1984 | Kashiwa et al. | 526/125 |
| 4,448,944 | 5/1984 | Berthold et al. | 526/125 |
| 4,471,066 | 9/1984 | Sakurai et al. | 502/113 |
| 4,552,859 | 11/1985 | Band et al. | 502/127 |

FOREIGN PATENT DOCUMENTS

| | | | |
|---|---|---|---|
| 45975 | 2/1982 | European Pat. Off. | 526/128 |
| 1245507 | 9/1971 | United Kingdom | 526/165 |

OTHER PUBLICATIONS

Boor, Ziegler Natta Catalyst and Polymerizations, Academic Press, N.Y. (1979) p. xii, 602-608.

*Primary Examiner*—Edward J. Smith
*Attorney, Agent, or Firm*—Sigalos, Levine & Montgomery

[57] ABSTRACT

A catalyst composition for the polymerization of propylene comprising a catalytic solid comprising a titanium halide and a magnesium halide and isoprenyl aluminum associated therewith and the process of polymerizing propylene using such catalyst.

7 Claims, 1 Drawing Sheet

CATALYST SYSTEM FOR THE POLYMERIZATION OF PROPYLENE AND PROCESS

BACKGROUND OF THE INVENTION

The present invention concerns a catalytic composition with improved activity stability with time for the polymerization of propylene. It is known that, in a general way, catalysts based on trialkyl aluminum associated with supported transition metal halides and, more particularly, with trivalent and tetravalent titanium chlorides are not very stable in activity with time in the polymerization of propylene. Contrary to all expectations, it has been observed that isoprenyl aluminum (IPRA), associated with titanium chlorides and, more particularly, with supported $TiCl_4$, makes it possible to obtain a polymerization catalyst for propylene, which possesses an excellent activity stability with time.

From French Pat. Nos. 2,332,288 and 2,363,583 and U.S. Pat. No. 4,220,745 it is known to associate an organometallic aluminum compound with the catalytic base for the polymerization of olefins, constituted of a titanium halide supported on a magnesium halide and of an electron donor.

Although the activity stability with time of these catalytic systems is recognized in the case of the suspension polymerization of ethylene, it decreases very rapidly in the case of the polymerization of propylene. As already indicated, it has been observed that among the numerous utilizable and utilized organometallic aluminum compounds, only IPRA makes it possible to obtain a catalytic system whose activity increases at the start of polymerization in order to stabilize itself during a long period of polymerization which, depending on conditions, can extend over several hours.

SUMMARY OF THE INVENTION

The present invention provides a catalytic composition having stable activity with time for the polymerization of propylene.

Briefly, the present invention comprises a catalyst composition for the polymerization of propylene comprising a catalytic solid comprising a titanium halide and a magnesium halide and isoprenyl aluminum associated therewith.

The invention also the process of polymerizing propylene comprising carrying out the polymerization at a pressure below about 250 bars and a temperature below about 250° C. for a time sufficient to effect the degree of polymerization desired in the presence of a catalyst composition comprising a catalytic solid comprising a titanium halide and a magnesium halide and isoprenyl aluminum associated therewith.

It is particularly preferred to include an electron donor, a Lewis base, as part of the catalyst composition.

DETAILED DESCRIPTION

Figure 1:
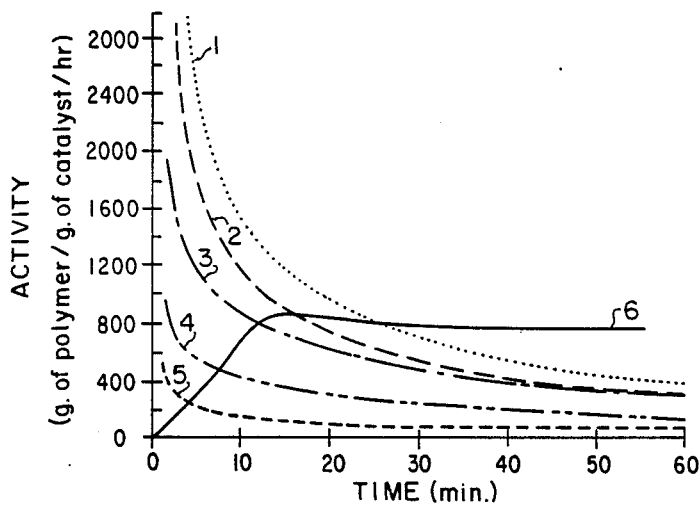
FIG. 1 is a graph illustrating various curves of the activities of certain catalysts over time.

IPRA is a known product and it is customarily prepared by heating triisobutyl aluminum or possibly diisobutyl aluminum hydride, in the presence of isoprene. Some isobutylene is released and hydrocarbon fractions coming from the isoprene become linked to the aluminum.

The catalyst component solid of at least $MgCl_2$ and $TiCl_4$ is customarily prepared by impregnation of the $MgCl_2$ with $TiCl_4$ brought to an average size of suitable particles or, better still, although these procedures are not limiting, by co-crushing of the $MgCl_2$ with $TiCl_4$ in the presence or without the presence of an electron donor at a temperature below about 130° C.

In the catalyst system the ratio of the number of aluminum atoms to the number of titanium atoms customarily is located between about 0.5 and 1000 and, better still, between 1 and 400. The catalytic system can be preformed by placing the catalytic solid composed at least of $MgCl_2$-$TiCl_4$ into contact with the IPRA prior to being brought in contact with the propylene. One can likewise add the catalytic solid and the IPRA separately in the polymerization zone of the propylene.

The Lewis base, an organic compound comprising one or several hetero-atoms such as O, N, S, which can be introduced into the catalytic system can, for instance, be selected from among aliphatic or aromatic carboxylic acids and their alkyl esters, aliphatic or aromatic ethers, ketones, vinyl esters, acrylic derivatives, in particular alkyl acrylates or methacrylates, and silanes. Particularly suitable are compounds such as methyl para-toluate, ethyl benzoate, ethyl or butyl acetate, ethyl ether, ethyl anisate, tetrahydrofuran, dioxane, acetone, methylisobutylketone, vinyl acetate, methyl methacrylate and phenyltriethoxysilane.

It is not excluded to associate at least one other organometallic compound of aluminum with the IPRA in the catalytic system. This adition, while improving amongst other things the tacticity of the polymers obtained from the systems according to the invention, absolutely does not adversely affect the activity stability and this is so in spite of the lack of this stability in catalytic systems implemented from these other organometallic aluminum compounds. This or these other organometallic aluminum compounds can be introduced into the catalytic system at any moment. It can, for instance, be directly associated with the IPRA. It can even be introduced within the scope of a prepolymerization of the propylene as a cocatalyst of the catalytic solid, with the IPRA being added later singly or associated with another organometallic aluminum compound. It goes without saying that it is always possible and even recommended to associate at least one electron donor with all this new catalytic system.

This other organometallic aluminum compound can be selected from among organoaluminum compounds of the formula $Al(R')qMrHs$, in which M represents Cl or OR', R' designates an alkyl radical with $C_1$ to $C_{16}$ and preferably $C_1$ to $C_{12}$, while q, r and s are numbers such that $1 \leq q \leq 3$, $0 \leq r \leq 2$, and $0 \leq s \leq 2$ with $q+r+s=3$. Preferably, it is selected from among the organoaluminum compounds of the formula $AlR''_xCl(3-x)$, in which $R''$ designates an alkyl radical containing $C_1$ to $C_8$ and x is a number such that $1 \leq x \leq 3$. Examples of these compounds are such as triethylaluminum, triisopropylaluminum, triisobutylaluminum, tri-n-hexylaluminum, tri-n-octylaluminum, diethylaluminum chloride.

It can also be slected from among the alumino-oxanes of the formula

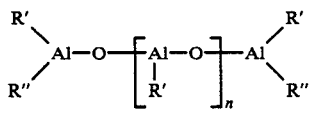

in which R' is an alkyl radical containing $C_1$ to $C_{16}$ or a halogen, the R" groups together form an —O— radical or each designate an R' radical, and n is a whole number taking on the values from 0 to 20.

The curves of FIG. 1 illustrate the unexpected effect of IPRA. These curves schematize the comparative kinetics of the activity with time of the principal organometallic aluminum compounds associated with $MgCl_2$ and $TiCl_4$ in a polymerization of propylene in 500 ml of heptane under a pressure of 4 atmospheres at 60° C. with the concentration of alkyl aluminum in the medium, calculated as aluminum, being 10 millimoles per liter. While, compared to triethylaluminum (TEA) (curve 1), triisobutylaluminum (TIBAL) (curve 2), trioctylaluminum (TOA) (curve 3) and diethylaluminum chloride (DEAC), classical cocatalysts involving a rapid drop in the activity time of the catalytic system, one expects to obtain a similar curve (4) with IPRA, on the contrary one obtains the curve (6) demonstrating the stability with time of the catalytic activity of the system.

The conditions of polymerization; in suspension in an inert liquid medium, or in liquid propylene, or yet according to a polymerization procedure of the propylene in solution in an inert liquid medium with the catalytic composition according to the invention, particularly temperatures, pressures, quantity of the catalytic system, are those which are customarily proposed for similar cases utilizing conventional catalytic systems of the supported Ziegler-Natta type. Operation can, for instance, take place at temperatures going up to about 250° C. and under pressures going from atmospheric pressure to about 250 bars, possibly in the presence of hydrogen.

Prior to the polymerization, a prepolymerization can be carried out at a temperature below that of the polymerization, in general below 60° C. under a pressure between the atmospheric pressure and 100 bars, up to a degree of conversion between 1 and 100, by placing the catalytic solid in contact with an organometallic aluminum compound, an olefin and, possible, a Lewis base; with the IPRA being added alone or added to another organometallic aluminum compound in the prepolymerizate.

The invention will be further described in connection with the following examples which are given for purposes of illustration only. The tacticities given in the examples are expressed in percentage of insoluble matter (IH%) in the heptane under refluxing.

EXAMPLE 1

In comparative manner, this example shows the activity stability with time of a catalytic system with, as cocatalyst, IPRA on one hand and triethylaluminum (TEA) on the other hand.

A. Preparation of the catalytic solid $MgCl_2$-$TiCl_4$ aromatic ester 1. 10.5 g (110.5 millimoles) of anhydrous $MgCl_2$ are dried thermally in vacuo at 300° C. for 2 hours.
2. $MgCl_2$ is then crushed for 2 hours in a steel crushing bowl of 80 ml capacity containing 50 g of steel balls of various diameters (4, 6, 8, 12 mm). The bowl is moved by a reciprocating vertical movement transmitted by a motor with the help of an excentric rod system. The frequency is 8 Hertz for a speed of 500 RPM.
3. Methyl paratoluate is added to the previously crushed $MgCl_2$ in such a way that the molar ratio of $MgCl_2$/aromatic ester is equal to 16. Co-crushing is taken up again for 6 hours, always under inert atmosphere.
4. The $MgCl_2$ and aromatic ester support is placed in suspension in heptane. 10 ml of $TiCl_4$ are added and the suspension is kept at 60° C. for 2 hours. The $TiCl_4$ concentration is 6 moles per liter.
5. Following reaction, the supernatant liquid is removed and the solid is dried in vacuo at ambient temperature. The catalytic solid obtained contains 2.3% of the titanium by weight.

B. Preparation of the catalytic solution

Under inert atmosphere, the following are successively introduced into a balloon flask:
(i) 500 ml of heptane;
(ii) IPRA and in another test TEA by way of comparative test. The quantities introduced represent 5 millimoles calculated as aluminum; and
(iii) about 50 mg of the preceding catalytic solid.

C. Polymerization

The thus prepared catalytic solution is immediately transferred, still under inert atmosphere, into a reactor of 1-liter capacity and placed under pressure of 4 bars of propylene. Under appropriate agitation, the temperature is kept at 60° C. The total pressure is kept at 4 bars absolute for 90 minutes. After expansion, the reaction is then stopped by the introduction of 10 ml of acidic methanol.

Figure 2:
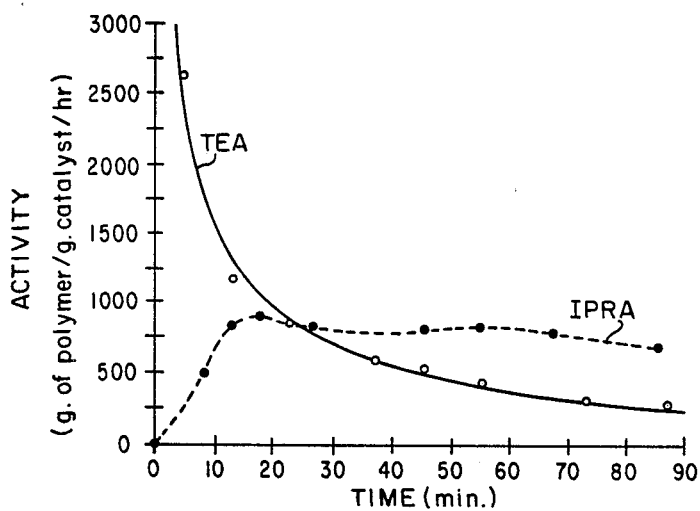
FIG. 2 is a graph illustrating the influence of IPRA and triethylaluminum (TEA) on polymerization kinetics.

FIG. 2 illustrates the influence of IPRA and of TEA on polmerization kinetics.

EXAMPLE 2

The conditions of preparation of the catalytic solid used in this example differ from those described in Example 1 both in the respective durations of the crushing stages; namely, 4 hours for stage 2, and 12 hours for stage 3, and in the nature of the aromatic ester used during the co-crushing stage. Here we use ethyl benzoate in such a way that the molar ratio of $MgCl_2$/aromatic ester is equal to 11. After impregnation with $TiCl_4$ and drying, the titanium content of the catalytic solid is 50 mg per gram of catalyst.

The procedure of Example 1 is used again by associating an electron donor; namely, ethyl anisate, with this new catalytic system.

The ethyl anisate is introduced at a rate of 250 rl (1.25 mole) to the catalytic solution described above in Example 1 and prior to the introduction of the catalytic solid.

Figure 3:
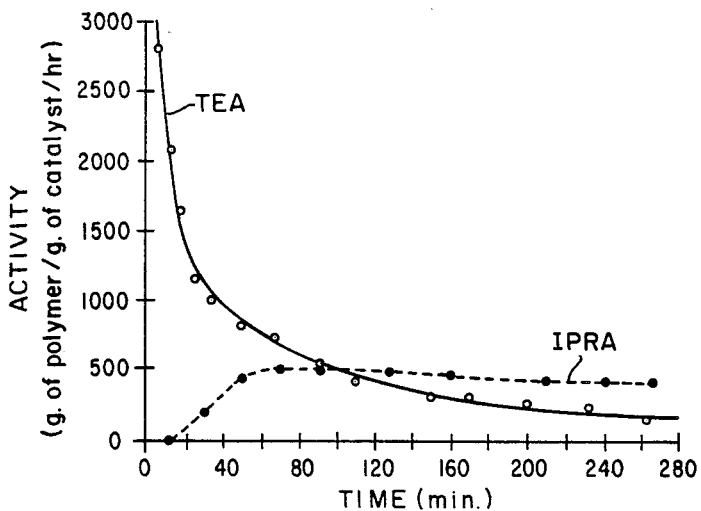
FIG. 3 is a graph illustrating the influence of IPRA and TEA, in the presence of ethyl anisate, on the polymerization kinetics.

FIG. 3 illustrates the influence of IPRA and TEA, by way of comparison, in the presence of ethyl anisate, on the kinetics of polymerization.

EXAMPLE 3

For this example, the catalytic solid used is the one described in Example 1.

Firstly, polymerization conditions of Example 2 are utilized, again by using as aromatic ester associated with the organoaluminum compound, under the circumstances IPRA, either ethyl benzoate or ethyl anisate. The quantity of ester introduced is calculated in such a way that the molar ratio of aluminum/aromatic ester is equal to 4.

After polymerization, products A and C are respectively obtained.

Secondly, a prepolymerization is carried out by introducing the following into a reactor under inert atmosphere:

(i) 20 ml of heptane;
(ii) TEA so as to have an aluminum concentration of 20 millimoles per liter;
(iii) Ethyl anisate so as to have a molar ratio of aluminum/ethyl anisate of 3 (Test D) or ethyl benzoate so as to have a molar ratio of aluminum/ethyl benzoate of 3 (Test B);
(iv) 1-hexene so as to have a molar ratio of hexene/titanium of 50; and
(v) About 50 mg of catalytic solid.

The prepolymerization takes place at 25° C. for 60 minutes under atmospheric pressure of propylene.

The prepolymerizates are taken up again and two polymerizations are carried out, still under the conditions of Example 2 in the presence once more of either ethyl benzoate (Test B) or ethyl anisate (Test D). The molar ratio of aluminum to ester then amounts to 4. The results obtained are given in the following table:

|  | Productivity (g propylene/ g of titanium) | IH |
|---|---|---|
| Test A | 19,600 | 80.7 |
| Test B | 31,700 | 82.2 |
| Test C | 8,700 | 91.1 |
| Test D | 17,000 | 89.2 |

EXAMPLE 4

In this example, the catalytic solid used is the same as the one used in Example 1.

The procedure of Example 2 is used again by mixing DEAC with the IPRA during the preparation of the catalytic solution in such a way that the system represents 5 millimoles calculated as aluminum.

The tacticites obtained are given in the table below; Tests B and D show the influence of the association of another organic aluminum compound with the IPRA on the tacticity.

| Test | Ratio IPRA/DEAC calculated as aluminum | Ratio Al/anisate | IH |
|---|---|---|---|
| A | IPRA alone | 4 | 92.2 |
| B | 5 | 4 | 94.2 |
| D | IPRA alone | 6 | 86.7 |
| E | 3 | 6 | 93.6 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A catalyst composition for the polymerization of propylene comprising a catalytic solid consisting essentially of a mixture of $MgCl_2$ and a first Lewis base on which a tetravalent titanium halide is impregnated and a cocatalytic component associated therewith consisting essentially of isoprenyl aluminum alone or with a second Lewis base the same as or different than said first Lewis base; said Lewis bases being aromatic esters.

2. The catalyst composition of claim 1 wherein said composition also contains a second organometallic aluminum compound and said titanium halide is a tetravalent titanium chloride.

3. The catalyst composition of claim 2 wherein said second organometallic aluminum compound is selected from a compound of the formula Al(R')qMrHs, in which M is Cl or OR', R' is a $C_1$ to $C_{16}$ alkyl radical, and q, r, and s are numbers such that $1 \leq q \leq 3$, $0 \leq r \leq 2$, and $0 \leq s \leq 2$ with $q+r+s=3$, or a compound of the formula

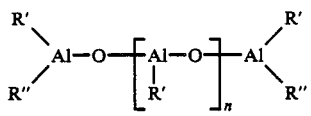

in which R' is a $C_1$ to $C_{16}$ alkyl radical or a halogen, the R" groups taken together form an —O— radical or each being a $C_1$ to $C_{16}$ alkyl radical or a halogen, and n being a whole number from 0 to 20.

4. The catalyst composition of claim 1 or 2 wherein the ratio of the number of aluminum atoms to the number of titanium atoms is between about 0.5 and 1,000.

5. A catalyst composition for the polymerization of propylene consisting essentially of a catalytic solid consisting essentially of a tetravlent titanium halide impregnated on a mixture of magnesium chloride and a Lewis base and a cocatalytic component consisting essentially of isoprenyl aluminum; said Lewis base being an aromatic ester.

6. The catalyst composition of claim 5 wherein said titanium halide is a tetravalent titanium chloride.

7. The catalyst composition of claim 5 or 6 wherein the ratio of the number of aluminum atoms to the number of titanium atoms is between about 1 and 400, the composition also contains at least one second organometallic compound selected from a compound of the formula Al(R')qMrHs, in which M is Cl or OR', R' is a $C_1$ to $C_{16}$ alkyl radical, and q, r, and s are numbers such that $1 \leq q \leq 3$, $0 \leq r \leq 2$, and $0 \leq s \leq 2$ with $q+r+s=3$, or a compound of the formula

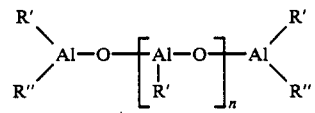

in which R' is a $C_1$ to $C_{16}$ alkyl radical or a halogen, the R" groups taken together form an —O— radical or each being a $C_1$ to $C_{16}$ alkyl radical or a halogen, and n being a whole number from 0 to 20.

* * * * *